UNITED STATES PATENT OFFICE.

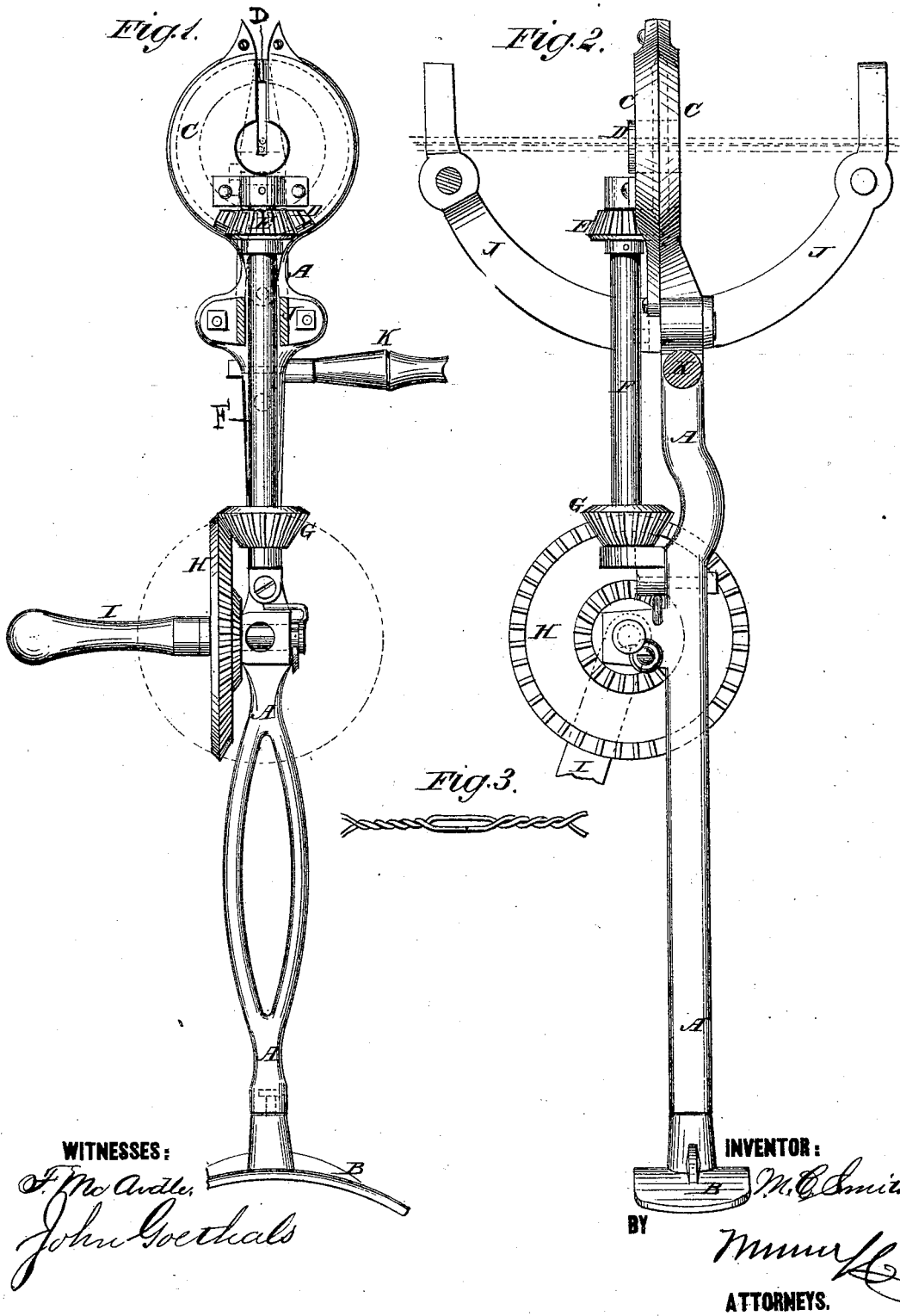

MOSES C. SMITH, OF STARKVILLE, NEW YORK.

IMPROVEMENT IN WIRE-WORKING TOOLS.

Specification forming part of Letters Patent No. 178,388, dated June 6, 1876; application filed April 25, 1876.

*To all whom it may concern:*

Be it known that I, MOSES C. SMITH, of Starkville, in the county of Herkimer and State of New York, have invented a new and Improved Wire-Twister, of which the following is a specification:

Figure 1 is an edge view of my improved machine, part being broken away to show the construction. Fig. 2 is a side view of the same, part being broken away to show the construction. Fig. 3 shows the twisted tie.

The object of this invention is to furnish an improved machine for twisting the ends of a wire band together, to form a tie after the band has been passed around a bale or other bundle.

The invention consists in the combination of the slotted case, the slotted gear-wheel, the slotted arms, the gear-wheels, and shaft with each other and with the shank, as hereinafter fully described.

A is the shank of the machine, to the upper end of which is swiveled a breast-plate, B. The lower end of the shank A is widened into circular form, and is concaved upon one side to form half of the case C, the other half of which is secured to said first half and the shank. In the case C is inclosed a large bevel-gear wheel, D, the ends of the hub of which project through holes in the center of the case C. The case C, from its lower side, and the gear-wheel D, from its rim, are slotted, said slots leading into the center of the gear-wheel D. E is a small gear-wheel, the side of which passes in through the side of the case C, and its teeth mesh into the teeth of the gear-wheel D. The gear-wheel E is attached to the shaft F, which revolves in bearings attached to the shank A and case C. To the upper part of the shaft F is attached a small bevel-gear wheel, G, the teeth of which mesh into the teeth of the large bevel-gear wheel H, pivoted to the shank A, and to which is attached a crank, I, which serves as a handle for applying power to operate the machine. To the opposite sides of the lower part of the shank A are attached curved arms J, the lower ends of which are slotted in line with the slot in the case C and gear-wheel D. To the shank A, upon the opposite side from the gear-wheel H, is attached a handle, K, for convenience in holding the machine.

In using the machine the wire band is passed around the bale, and its lapped ends are passed into the slots in the arms J, case C, and wheel D, and the crank I is turned four or five revolutions, which will twist the wires together, as shown in Fig. 3.

The device is shown in the drawings as arranged for twisting wires that pass around the bale the short way.

When the wires are passed around the bale the long way, the gear-wheel H and handle K are detached and moved one-quarter around the shank A, and are again attached to it.

Having thus described my invention, what I claim as new, and desire to secure by Letters Patent, is—

The combination of the slotted case C, the slotted gear-wheel D, the slotted arms J, the gear-wheels E G H, and shaft F with each other and with the shank A, substantially as herein shown and described.

MOSES C. SMITH.

Witnesses:
JOHN R. HALL,
ROBERT C. HALL.